United States Patent [19]
Cavalloni et al.

[11] Patent Number: 5,696,201
[45] Date of Patent: Dec. 9, 1997

[54] SOUND AND HEAT INSULATION HAVING LITTLE ODOR

[75] Inventors: Carlo Cavalloni, Eschenmosen, Switzerland; Antonio La Grotteria, Caresonablot, Italy; Harald Freyer, Rotenburg an der Fulda, Germany

[73] Assignee: Matec Holding AG, Kusnacht, Switzerland

[21] Appl. No.: 581,430

[22] Filed: Dec. 29, 1995

Related U.S. Application Data

[63] Continuation of Ser. No. 157,090, Dec. 3, 1993, abandoned.

[30] Foreign Application Priority Data

Apr. 6, 1992 [CH] Switzerland .................. 01 111/92

[51] Int. Cl.⁶ .................................................. C08L 61/06
[52] U.S. Cl. .................... 524/594; 524/593; 524/611; 264/83; 264/113; 264/121; 264/126
[58] Field of Search .......................... 524/594, 593, 524/611; 264/83, 113, 121, 126

[56] References Cited

U.S. PATENT DOCUMENTS 4,393,019  7/1983  Geimer ............................ 264/83
4,409,170  10/1983  Stofko ............................ 264/113

FOREIGN PATENT DOCUMENTS 0 076 429  4/1983  European Pat. Off. .
0 262 092  3/1988  European Pat. Off. .
48-019 215  6/1973  Japan .

*Primary Examiner*—Paul R. Michl
*Assistant Examiner*—John J. Guarriello
*Attorney, Agent, or Firm*—Gary M. Nath; Nath & Associates

[57] ABSTRACT

A process which permits the production of mouldings which have little odor and comprise fibrous semifinished products to which heat-curing novolak resins have been added and which are suitable for lining heat-emitting and/or sound-emitting vehicle parts, in which their binders are completely and uniformly crosslinked. The odor emission, in particular the formaldehyde emission, is thus reduced. This process furthermore permits the production of products having an unusually large layer thickness. The homogeneous polymerisation reaction is achieved by the use of a hot fluid in the form of a dry, saturated steam and under elevated pressure.

9 Claims, 1 Drawing Sheet

SOUND AND HEAT INSULATION HAVING LITTLE ODOR

This application is a continuation application of U.S. patent application Ser. No. 08/157,090, now abandoned, filed Dec. 3, 1993, the entire contents of which are hereby incorporated in their entirety.

BACKGROUND OF THE INVENTION

1) Field of the Invention

The present invention relates to a porous, sound-insulating and/or heat-insulating moulding, in particular for lining sound-emitting and/or heat-emitting vehicle parts, comprising a fibrous semifinished product to which thermosetting binders have been added and which are shaped and solidified in a compression mould. The present invention also relates to a particular process for the production of such a moulding.

2) Description of the Related Art

Mouldings are preferably used in the automotive industry, where they are fixed as insulating mats to the floor of the body, to the dashboard or in the engine space or boot. For installation with an exact fit, these mouldings are shaped to correspond to the particular contours. Depending on their particular use, these mouldings are provided with a fabric-like decorative layer or rubber-like protective layer.

It is particularly important to the automotive industry to equip the vehicles with acoustically effective insulations, not only for reasons relating to comfort. In particular, it is now generally known that undesirable psychological and physical reactions, such as, for example, stress and nausea, can be triggered in the passengers by certain noises during driving and odors.

Particularly good results can be obtained with mouldings comprising fibrous semifinished products. Many processes for the production of such mouldings obtained by compression moulding of nonwoven fabrics have therefore also been disclosed.

For example, Switzerland Application 671 describes such a noise-reducing structural element, one layer of which consists of a porous thermoformed fibre mat, the predominantly natural fibres of which are bound with a thermosetting binder, for example a heat-curing phenol resin, urea resin and/or melamine resin, preferably with phenol/formaldehyde and urea/formaldehyde resins of the novolak type. A semifinished product in which the binder is incorporated as a scattered fine-grained powder is used for the production of this fibre mat. This semifinished product is introduced into a heatable mould, heated to 150°–200° C. and shaped.

Sound-insulating mouldings up to 30 mm thick can be produced by this process. In the case of thicker mouldings, too little heat reaches the inner regions, and the polymerization reaction can therefore only take place incompletely. Increasing the temperature of the compression mould is not a suitable measure, owing to the natural fibres used and the combustion temperature thereof.

Japanese Publication B-48 019 215 deals with an analogous problem which arises in the chipboard industry. There, in order to compensate the temperature gradient which results during the pressing of thicker chipboards, chips are to be used which are coated with different binders and are placed in layers one on top of the other in such a way that the wood chips coated with a binder reacting at lower temperatures are present in the cooler middle zone. Unfortunately, this publication contains no useful teaching for the person skilled in the art in the area of the present invention, in particular because the fibres used for moulding sound-insulating and heat-insulating mats are not individually coated.

Furthermore, U.S. Pat. No. 4,623,499 relates to the preparation of products comprising wood fibres or wood chips and proposes the use of a fluid under superatmospheric pressure as a heat transfer medium. This process, too, does not solve the emission problems mentioned at the outset.

The above-mentioned problem of a pronounced temperature gradient during the moulding of thick nonwoven fabrics and therefore of an irregular chemical reaction of the binders is also dealt with in European application A-076 429. The solution proposed in this publication aims to use a reaction accelerator and in particular to apply a substance which eliminates ammonia on heating, for example urea, to the surface of the nonwoven fabric, in particular prior to the heat treatment during moulding. The additional ammonia produced by this procedure abruptly penetrates the nonwoven fabric and increases the usually low ammonia concentration in the interior of the nonwoven fabric, which accelerates the condensation process in this region. Unfortunately, this process proves to be expensive since the urea solution applied to the surface requires additional preparation steps; the heat of reaction required must be supplied by hot air convection.

An analogous solution is also proposed in U.S. Pat No. 4,623,499: allowing a catalytic reaction gas suitable for the polymerisation reaction to flow through the closed compression mould. However, it has been found that no odorless mouldings can be produced by the flow-through technique (dynamic process). In particular, regions of good flow and poor flow appear to form in the moulding. Furthermore, regions which have been compressed to different extents or regions having an increased water content appear to lead to locally greatly differing reaction initiation times. In any case, mouldings having a thickness of more than 30 mm cannot be satisfactorily cured by this process and exhibit signs of combustion at the entry joints.

A process which has become known under the name HCTM uses superheated steam—with a correspondingly lower moisture content—and allows said steam to flow through a moderately heated compression mould. The superheated steam first condenses on the cooler parts and wets the moulding. This process makes it possible to achieve temperatures of more than 200° C. rapidly and without corresponding heating of the entire compression mould. Unfortunately, this process produces undesirably large amounts of toxic substances which have to be collected again in an additional apparatus.

A major disadvantage of the processes described above is that the binder present in powder form in the semifinished product is transported away by the flowing medium and therefore leads to local inhomogeneities of the binder distribution. Furthermore, these resins blown away in this manner generally condense at the outlet orifices of the compression mould and necessitate expensive manual maintenance/cleaning thereof. However, the undesirably large amounts of toxic substances (formaldehyde, ammonia, phenol, etc.) which are liberated by the incomplete crosslinking of the binders Drove to be particularly problematic. Regions which are evidently critical are those in which heating has not been sufficiently effective so that the binders have probably liberated ammonia and formaldehyde but, owing to too low a temperature, the resin was unable to undergo crosslinking with the formaldehyde. Moreover, the regions with insufficiently crosslinked binders are subject to rapid decomposition, give rise to an unpleasant odor as secondary effects and are potential sources of rotting and mould.

BRIEF DESCRIPTION OF INVENTION

It is therefore the object of the present invention to provide a moulding which does not have the disadvantages of the known mouldings and in particular has lower potential emission of toxic substances and unpleasant odors.

Possible solutions are, for example, an increase in the process time and/or an increase in the process temperature. In this connection, it should be considered that the maximum permissible temperature if carbonization of the natural fibres is to be avoided is 180° C. In all known cases, the binder content is such that sufficient stability is achieved even in the poorly crosslinking regions of the moulding. The relatively high contents of uncrosslinked binders or cleavage products are accepted.

According to the invention, however, the object is achieved by providing a moulding whose binder is uniformly crosslinked in all regions of the porous fibrous moulding. In particular, a moulding which contains only an amount of binder such that the binder emits is less than 15–20 ppm during the homogeneous polymerisation reaction. In all products produced so far, it has in fact been found that there is no uniform polymerisation or crosslinking, and, depending on the degree of moulding and the thickness, the moulding has localised burnt and/or even uncrosslinked regions.

It is therefore also the object of the present invention to provide a process for the production of a moulding according to the invention, by means of which process the polymerisation reaction is as far as possible initiated simultaneously and can take place equally rapidly at all points of the nonwoven fabric and independently of the specific shaping procedure and of the moisture content.

This object is achieved, according to the invention, if, in order to initiate the polymerisation reaction, a hot fluid under elevated pressure in the range of 2–20 bar is introduced into the cavity of the pressure-tight compression mould, which cavity contains the semifinished product, the fluid is maintained under this pressure for the duration of the polymerisation of the binder and, before the moulding produced is removed from the opened compression mould, the fluid is discharged from the compression mould and fed to a filter unit.

DESCRIPTION OF THE FIGURE

The FIGURE shows a compression mould according to the invention.

DESCRIPTION OF THE PREFERRED EMBODIMENT

Figure 1:
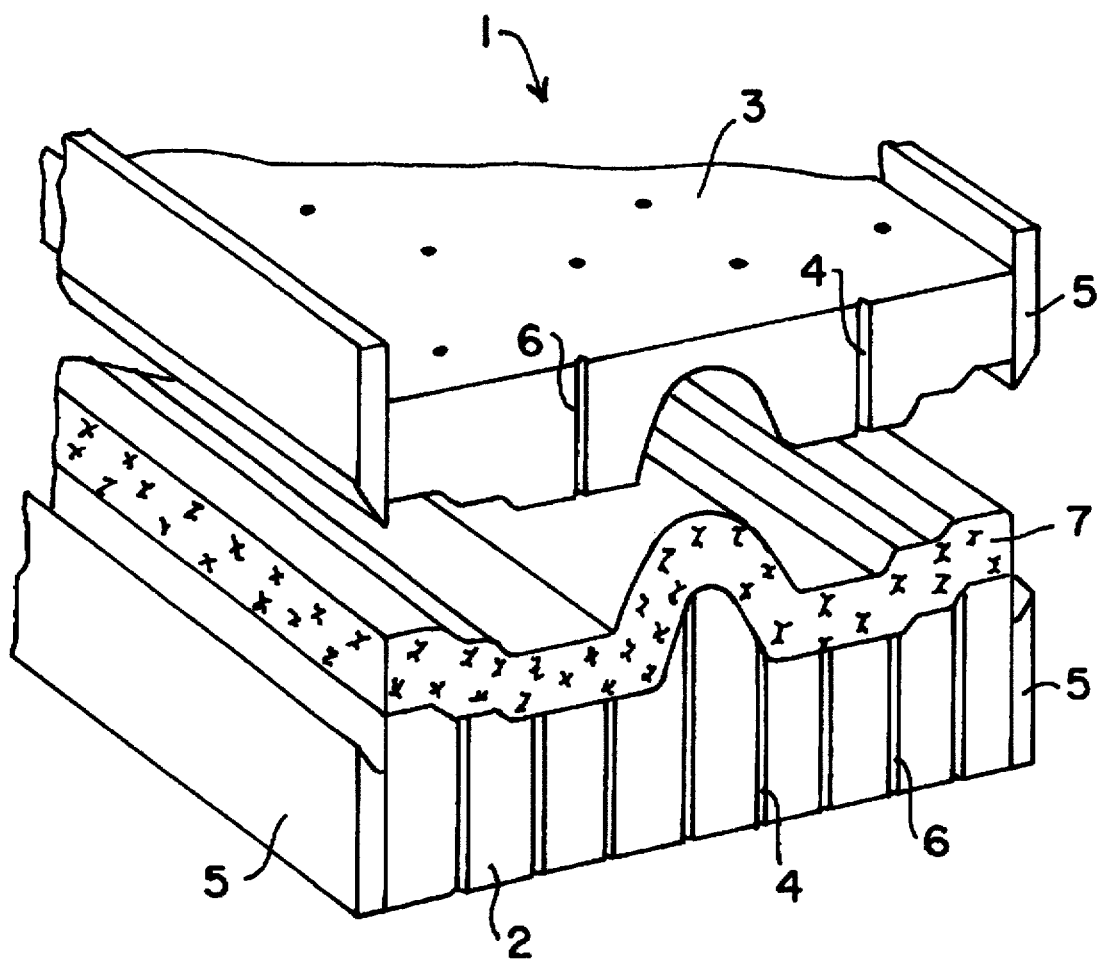

In the process for the production of the moulding according to the invention, a semifinished product consisting of at least one layer is placed in an open heatable and coolable compression mould, sealed in a pressure-tight manner when the compression mould is closed and compressed if required. After evacuation of the air from the mould cavity, and as a result of the introduction of a high-energy compressed gas, preferably saturated steam, into the mould cavity, the temperature and moisture content which are ideal for the reaction are simultaneously produced in all regions of the moulding. This compressed gas produces, in the mould cavity, an internal pressure of several bar, which is maintained until the binder introduced, preferably a heat-curing novolak resin, has completely polymerised. The novolak resin can be, but is not limited to, a phenol/formaldehyde or a urea/formaldehyde type resin. In contrast to conventional processes, no fluid flow is therefore produced but the pressure conditions remain stable during curing. Thus, most of the gaseous and toxic cleavage products produced can participate in the crosslinking during the entire curing time. The proportion of unpolymerised binders is therefore considerably reduced. Consequently, for example, phenol novolak powder resins having a substantially lower content of hexamethylenetetramine can be used. This also leads to a reduction in emission. Furthermore, for the production of a product having certain mechanical properties, the amount of binder required can be dramatically reduced compared with the conventional processes. Finally, possible unbound cleavage products can be avoided by a substantially complete reaction of the binder. There are therefore considerably lower emissions of formaldehyde, phenol and ammonia, with the result that odors are also reduced to a decisive extent. Compared with conventional processes, the process improves in particular the use of the energy required for the production.

Of course, it is also possible to use a catalytic pressure medium as the compressed gas.

A heatable compression mould suitable for carrying out the process has a first mould part having steam feed pipes. A second mould part is impermeable to steam and forms a pressure-tight seal with the first mould part.

An embodiment of the moulding according to the invention and the preferred process for the production thereof are to be described below with the aid of the FIGURE. The only FIGURE shows moulding according to the invention which has been shaded in a suitable compression mould. This FIGURE shows a compression mould 1 which consists of a lower mould half 2 and an upper mould half 3, these mould halves being heated by conventional means not shown here. These two mould halves together form a mould cavity in which the semifinished product is moulded and cured. A preferred semifinished product consists of a nonwoven fabric comprising predominantly natural fibres with other fillers in small amounts and contains added pulverulent novolak resins.

The workpieces usually to be produced and having the dimensions 150 mm×150 mm to 1800 mm×2000 mm have a density of 40 kg/m$^3$ to 1200 kg/m$^3$. In the embodiment shown, the two mould halves have a large number of fine channels 4 which have a diameter of 1–4 mm and through which the fluid is passed into the mould cavity. The compression mould shown has, at its edges, cutting and sealing elements 5 which can be independently moved and displaced and seal the closed mould perimetrally in a pressure-tight manner, for example by a labyrinth seal. After the compression mould 1 has been closed in a pressure-tight manner, the semifinished product is exposed to the hot fluid. According to the invention, the fluid used is saturated dry steam. This fluid has a static pressure of 2–20 bar, usually 10 bar, and remains in the mould cavity for about 20–200 seconds at 150°–200° C. under this pressure.

The present invention is based, inter alia, on the knowledge that, for a rapid and uniform polymerisation reaction, the fluid should have as high an enthalpy as possible at the predetermined pressure which is determined by the compression to be achieved.

According to the invention, a fluid whose of aggregation is defined by the limiting curve between wet vapour and superheated steam in its Mollier diagram is used for this purpose. As a result, not only is the polymerisation reaction initiated at all points of the fibrous semifinished product but furthermore the gaseous cleavage products of the binder remain in the region of the resin and are not flushed away. Thus, even uniformly crosslinked mouldings 7 having a thickness of more than 50 mm and preferably more than 80 mm can be produced. Before the compression mould is opened, the pressure medium is discharged, for example via channels 6 which can be shut off.

Cotton fibres, in particular recycled cotton fibres, are preferably used for the production of the fibrous semifinished products. Outstanding acoustic and odorless products can, however, also be obtained using nonwoven fabrics which contain other porous materials, in particular foamed rubber or residues of glass fibre or manmade fibre fabrics.

The Table below shows the measured emission factors for two mouldings produced by conventional processes and for a moulding according to the invention:

| Pollutants | Conventional moulding (1987) | Conventional moulding (1990) | Moulding according to the invention (1992) |
|---|---|---|---|
| Phenol | 0.07 g/kg | 0.2 g/kg | 0.00033 g/kg |
| Formaldehyde | 0.00624 g/kg | 0.006 g/kg | 0.0007 g/kg |
| Ammonia | 2.6 g/kg | 2.6 g/kg | 0.64 g/kg |

These measurements show impressively how the emission factor is surprisingly substantially reduced in the case of the moulding 7 according to the invention with its uniform degree of crosslinking.

An odor measurement according to Ford gave the ratings x=2.4 and s=0.42 for a product according to the invention.

Of course, with this uniform polymerisation, the amount of binder usually required can be metered in a more appropriate manner and hence a more constant quality can be achieved.

A further advantage of the production process according to the invention is that the compression moulds have to be cleaned substantially less frequently or a smaller amount of mould release agent has to be used. The process according to the invention also permits for the first time the production of completely polymerised mouldings having a thickness of more than 80 mm.

It is of course also clear that the fibrous moulding according to the invention not only can be used generally in the vehicle industry but can be used for reducing noise and heat emission by electrical machines and plants, construction machines, fans, pumps, etc.

We claim:

1. A process for the production of a porous moulding from a fibrous semifinished product which comprises at least one nonwoven fabric consisting predominantly of fibres and a thermosetting binder, said process comprising:
    (a) placing said fibrous semifinished product in a heatable sealable compression mould;
    (b) closing and sealing said compression mould in a gas-tight manner;
    (c) subjecting said fibrous semifinished product to a homogeneous polymerisation reaction by introducing dry saturated steam into the cavity of said compression mould containing said fibrous semifinished product;
    (d) maintaining said dry saturated steam static in said compression mould whereby said dry saturated steam flows neither in nor out of said compression mould;
    (e) keeping said fibrous semifinished product in contact with said static dry saturated steam in said sealed compression mould for a desired residence time under elevated pressure in the range of 2–20 bar to produce a porous moulding having a thickness of more than 50 mm, whereby said binder is uniformly crosslinked in all regions of said moulding;
    (f) discharging spent dry saturated steam from said compression mould; and
    (g) thereafter removing said moulding from said compression mould;
    wherein said placing is of a fibrous semifinished product in which said binder is present in an amount sufficiently small such that said binder emits less than 20 ppm formaldehyde during said homogeneous polymerisation reaction.

2. The process according to claim 1, wherein said saturated, dry steam remains in said cavity for about 20 to about 200 seconds.

3. The process according to claim 2, wherein said placing is of a fibrous semifinished product in which said binder is a heat-curing phenol novolak powder resin.

4. The process according to claim 1 wherein said moulding produced has a thickness of more than 80 mm.

5. A process for the production of a porous moulding from a fibrous semifinished product which comprises at least one nonwoven fabric consisting predominantly of fibres and a thermosetting binder, said process comprising: placing said fibrous semifinished product in a heatable sealable compression mould, causing crosslinking of said binder in all regions of said moulding by closing said compression mould in a gas-tight manner, subjecting said fibrous semifinished product to a homogeneous polymerization reaction by introducing dry saturated steam into the cavity of said compression mould containing said fibrous Semifinished product, maintaining said dry saturated steam static in said compression mould, whereby said dry saturated steam flows neither in nor out of said compression mould, keeping said fibrous semifinished product in contact with said dry saturated steam in said sealed compression mould for a sufficient time and at a suitable temperature and pressure to produce a porous moulding having a thickness of more than 50 mm, whereby said binder is uniformly crosslinked in all regions of said moulding, discharging spent dry saturated steam from said compression mould, and thereafter removing said moulding from said compression mould, wherein said placing is of a fibrous semifinished product in which said binder is present in an amount sufficiently small such that said binder emits less than 20 ppm formaldehyde during said homogeneous polymerization reaction.

6. The process according to claim 5, wherein said keeping said fibrous semifinished product in said sealed compression mould is for a time of about 20 to about 200 seconds.

7. The process according to claim 5, wherein said keeping said fibrous semifinished product in said sealed compression mould is at a pressure of about 2 to about 20 bar.

8. A process for the production of a porous moulding from a fibrous semifinished product which comprises at least one nonwoven fabric consisting predominantly of fibres and a thermosetting binder, said process comprising:
    (a) placing said fibrous semifinished product in a heatable sealable compression mould;
    (b) closing and sealing said compression mould in a gas-tight manner;
    (c) subjecting said fibrous semifinished product to a homogeneous polymerisation reaction by introducing dry saturated steam into the cavity of said compression mould containing said fibrous semifinished product;

(d) maintaining said dry saturated steam static in said compression mould whereby said dry saturated steam flows neither in nor out of said compression mould;

(e) keeping said fibrous semifinished product in contact with said static dry saturated steam in said sealed compression mould for a desired residence time under elevated pressure in the range of 2–20 bar to produce a porous moulding, whereby said binder is uniformly crosslinked in all regions of said moulding;

(f) discharging spent dry saturated steam from said compression mould; and (g) thereafter removing said moulding from said compression mould;

wherein said placing is of a fibrous semifinished product in which said binder is present in an amount sufficiently small such that said binder emits less than 20 ppm formaldehyde during said homogeneous polymerisation reaction.

9. A process for the production of a porous moulding from a fibrous semifinished product which comprises at least one nonwoven fabric consisting predominantly of fibres and a thermosetting binder, said process comprising: placing said fibrous semifinished product in a heatable sealable compression mould, causing crosslinking of said binder in all regions of said moulding by closing said compression mould in a gas-tight manner, subjecting said fibrous semifinished product to a homogeneous polymerization reaction by introducing dry saturated steam into the cavity of said compression mould containing said fibrous semifinished product, maintaining said dry saturated steam static in said compression mould, whereby said dry saturated steam flows neither in nor out of said compression mould, keeping said fibrous semifinished product in contact with said dry saturated steam in said sealed compression mould for a sufficient time and at a suitable temperature and pressure to produce a porous moulding, whereby said binder is uniformly crosslinked in all regions of said moulding, discharging spent dry saturated steam from said compression mould, and thereafter removing said moulding from said compression mould, wherein said placing is of a fibrous semifinished product in which said binder is present in an amount sufficiently small such that said binder emits less than 20 ppm formaldehyde during said homogeneous polymerization reaction.

* * * * *